United States Patent [19]

Nakatsuji et al.

[11] Patent Number: 5,438,455

[45] Date of Patent: Aug. 1, 1995

[54] INTERNAL FOCUS TELEPHOTO LENS FOR AN AUTO FOCUS CAMERA

[75] Inventors: Masahiro Nakatsuji, Machida; Susumu Sato, Chiba, both of Japan

[73] Assignee: Nikon Corporation, Tokyo, Japan

[21] Appl. No.: 166,836

[22] Filed: Dec. 15, 1993

[30] Foreign Application Priority Data

Dec. 28, 1992 [JP] Japan .................................. 4-348316

[51] Int. Cl.$^6$ ............................................. G02B 13/02
[52] U.S. Cl. .................... 359/748; 359/684; 359/745
[58] Field of Search ............... 359/745, 748, 690, 684, 359/746, 747

[56] References Cited

U.S. PATENT DOCUMENTS

| | | | |
|---|---|---|---|
| 4,176,913 | 12/1979 | Nakamura et al. ................. | 359/745 |
| 4,457,595 | 7/1984 | Mihara ............................... | 359/745 |
| 4,534,626 | 8/1985 | Mihara ............................... | 359/745 |
| 5,323,270 | 6/1994 | Sato .................................... | 359/745 |

Primary Examiner—Georgia Y. Epps
Assistant Examiner—Michael A. Papalas
Attorney, Agent, or Firm—Shapiro and Shapiro

[57] ABSTRACT

In an internal focus telephoto lens comprised, in succession from the object side, of a first lens unit of positive refractive power, a second lens unit of negative refractive power and a third lens unit of positive refractive power, the first lens unit of positive refractive power and the second lens unit of negative refractive power together forming a substantially afocal system, focusing being effected by the second lens unit, the first lens unit has a front group of positive refractive power and a rear group having weak positive refractive power relative to the front group, the first group being comprised, in succession from the object side, of a positive lens component, a positive lens component and a negative lens component, the second lens unit has, in succession from the object side, at least a negative lens component and a negative lens component, and the third lens unit has a positive lens component, and various predetermined conditions are satisfied.

20 Claims, 3 Drawing Sheets

INTERNAL FOCUS TELEPHOTO LENS FOR AN AUTO FOCUS CAMERA

BACKGROUND OF THE INVENTION

1. Field of the Invention

This invention relates to an internal focus telephoto lens for an auto focus camera such as a single-lens reflex camera or an electronic still camera.

2. Related Background Art

An objective lens of this kind has heretofore had the tendency that when focusing is effected, the movement distance of the focusing unit thereof is very long and an increased photographing magnification results in a long movement distance of the focusing unit. This has led to the disadvantage that the burden of an auto focus driving motor becomes great and a mechanism for focusing becomes bulky.

SUMMARY OF THE INVENTION

The present invention provides an internal focus telephoto lens in which an excellent optical performacne is maintained and yet the amount of focusing movement is small.

Figure 1:
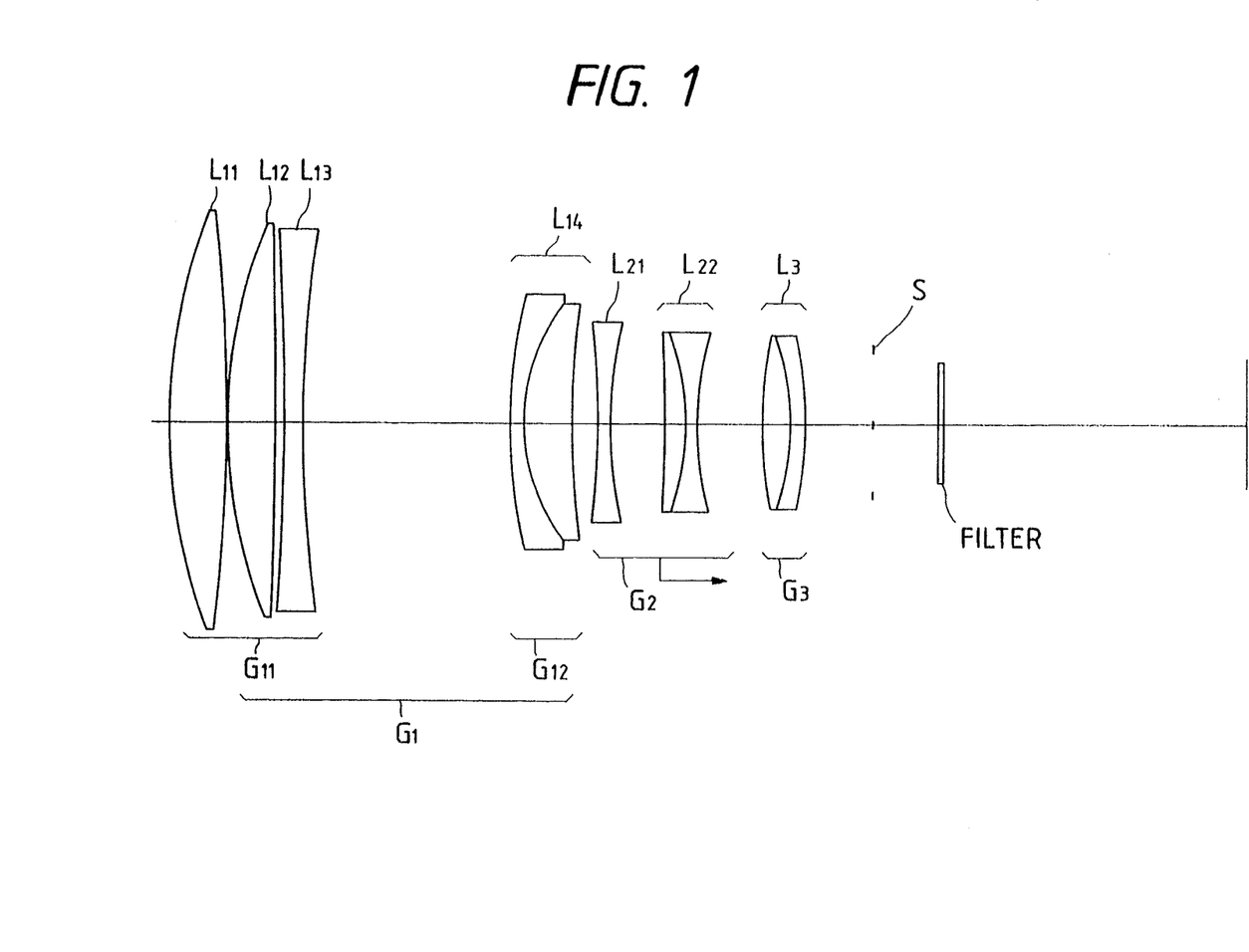
FIG. 1 shows the lens construction of Embodiment 1 of the present invention.

The present invention has been made in view of the above-noted disadvantage peculiar to the prior art, and as shown, for example, in FIG. 1 of the accompanying drawings, in an internal focus telephoto lens comprised, in succession from the object side, of a first lens unit G1 of positive refractive power, a second lens unit G2 of negative refractive power and a third lens unit G3 of positive refractive power, the first lens unit G1 of positive refractive power and the second lens unit G2 of negative refractive power together constituting a substantially afocal system, focusing being effected by the second lens unit G2, the first lens unit G1 has a front group G11 of positive refractive power and a rear group G12 having weak positive refractive power relative to the front group, the front group G11 being comprised, in succession from the object side, of a positive lens component L11, a positive lens component L12 and a negative lens component L13, the second lens unit G2 has, in succession from the object side, at least a negative lens component L21 and a negative lens component L22, and the third lens unit G3 has a positive lens component L3, and the internal focus telephoto lens is designed to satisfy the following conditions:

(1) $0.35 < f_1/F < 0.60$
(2) $0.7 < f_{22}/f_{21} < 1.6$
(3) $-1.0 < (R_b+R_a)/(R_b-R_a) < -0.4$
(4) $-2.1 < (R_d+R_c)/(R_d-R_c) < -1.7$ where
$f_1$: the focal length of the first lens unit G1;
F: the focal length of the whole system;
$f_{21}$: the focal length of the negative lens component L21 in the second lens unit G2;
$f_{22}$: the focal length of the negative lens component L22 in the second lens unit G2;
$R_a$: the radius of curvature of the object side of the negative lens component L21 in the second lens unit G2;
$R_b$: the radius of curvature of the image side of the negative lens component L21 in the second lens unit G2;
$R_c$: the radius of curvature of the image side of the positive lens component L12 in the first lens unit G1;
$R_d$: the radius of curvature of the object side of the negative lens component L13 in the first lens unit G1.

DESCRIPTION OF THE PREFERRED EMBODIMENTS

The basic construction of the photographing optical system of the present invention is a three-unit construction comprising positive, negative and positive units, and focusing is effected by a negative second lens unit. In the focusing system of such a construction, the second lens unit is moved in such a manner that the object side focus of the second lens unit is always made coincident with the vicinity of the image point by the imaging of a first lens unit relative to an object. Consequently, rays of light incident on a third lens unit are always rays of light substantially parallel to the optical axis of the optical system, and the image point of the whole system is always a predetermined position.

Considering the disposition of the refractive power of a thin system from what has been described above, the amount of movement for the focusing of a thick system can be primarily determined. Accordingly, to achieve the object of the present invention which is to reduce the amount of movement of the negative lens unit which is a focusing unit during focusing, the amount of movement of the image by the first lens unit having a focal length $f_1$ can be made small relative to the amount of movement of the object point.

So, when the first lens unit is regarded as a thin lens and the focal length thereof is $f_1$ and the object point distance is a and the image point distance is b, from the relational expression of the imaging of the lens, $$1/a + 1/b = 1/f_1 \rightarrow f_1 = a/(a/b+1) \qquad (1)$$

Next, considering the vertical magnification $\alpha$, the vertical magnification $\alpha$ is represented by the following equation:

$$\alpha = (-b/a)^2 = b^2/a^2 \rightarrow b = a\sqrt{\alpha} > 0 \qquad (2)$$

During focusing, the object point moves from a particular location and thus, the object point distance a varies, but when the lens is in focus to a certain object point distance a, that is, when the object point distance a is constant, the vertical magnification $\alpha$ can be made small to reduce the amount of movement of the image point by the first lens unit relative to the amount of movement of the negative second lens unit for focusing, i.e., the amount of movement of the object point.

So, if equation (2) is substituted for equation (1), $$f_1 = a/(1\sqrt{\alpha} + 1) \qquad (3)$$

Accordingly, if the vertical magnification $\alpha$ becomes smaller, the focal length $f_1$ will also become smaller. Therefore, if the focal length $f_1$ of the first lens unit is made smaller, the amount of focusing movement can be made smaller.

Also, when the second lens unit is regarded as a thin lens and the focal length thereof is $f_2$, the first lens unit and the second lens unit together form an afocal system and therefore, when the focal length of the third lens unit is constant, $$f_1/f_2 = \text{constant.} \quad (4)$$

Accordingly, when from equations (3) and (4), the focal length $f_1$ becomes smaller, the focal length $f_2$ also necessarily becomes smaller.

However, if the refractive powers of the first lens unit and the second lens unit are too strong, it will lead to the shortening of the full length, but aberrations as the entire photographing optical system will be aggravated. Therefore, in the present invention, it has been found that the above-mentioned conditional expressions (1)–(4) regarding the first lens unit and the second lens unit must be satisfied as conditions for making the amount of focusing movement small and obtaining good aberrations.

Expression (1) is a conditional expression regarding the ratio of the focal length of the first lens unit G1 to the focal length F of the whole system. If the upper limit of expression (1) is exceeded, the focal length $f_1$ of the first lens unit G1 will become longer and the full length of the optical system will also become greater. Also, the amount of focusing movement will become greater, and this is not preferable. If conversely, the lower limit of expression (1) is exceeded, the focal length $f_1$ of the first lens unit G1 will be too short and therefore, if an attempt is made to make the aperture of the first lens unit G1 great with the construction of the first lens unit kept small in the number of components as in the present invention, spherical aberration will be under-corrected and it will become difficult to provide a bright optical system. At the same time, the center thickness of the positive lens must be great and the weight of the photographing optical system will become heavy, and this is not preferable.

Expression (2) is condition regarding the optimum power distributions of the negative lens component L21 and negative lens component L22 in the second lens unit G2 as a focusing unit, and is necessary to secure a good imaging performance over infinity to a close distance.

Expression (2) is a condition which prescribes the refractive power arrangement of the negative lens component L21 and negative lens component L22 in the second lens unit G2.

If the lower limit of expression (2) is exceeded, the bending of spherical aberration will become too great from plus to minus as it goes from a lower incidence height toward a higher incidence height, and the correction thereof will become difficult. If conversely, the upper limit of expression (2) is exceeded, the bending of spherical aberration will become great from minus to plus as it goes from the lower incidence height toward the higher incidence height and that tendency will become stronger from infinity to the close distance and therefore, a sufficient focusing performance cannot be maintained.

Expression (3) represents the relation between the radius of curvature of the object side of the negative lens component L21 in the second lens unit G2 and the radius of curvature of the image side of the same lens component. If the upper limit of expression (3) is exceeded, spherical aberration created on the object side of the negative lens component L21 will become excessively great to plus and will bend greatly in the positive direction as the incidence height becomes higher and therefore, the correction thereof will become difficult. If conversely, the lower limit of expression (3) is exceeded, the radius of curvature Ra of the object side of the negative lens component L21 will become strong in the positive direction and therefore, plus spherical aberration created in this surface will decrease too much and will lack the balance with the spherical aberrations of the other lens units, and will have bending in the minus direction. Accordingly, if the range of this conditional expression is exceeded, the correction of it will become difficult.

Expression (4) represents the relation between the radius of curvature of the image side of the positive lens component L12 in the first lens unit G1 and the radius of curvature of the object side of the negative lens component L13 in the first lens unit G1. If the upper limit of expression (4) is exceeded, spherical aberration will become excessive to plus and spherical aberration for g line created in the first lens unit will bend more greatly in the plus direction and therefore, the correction thereof will become difficult and as a result, it will remain as a fluctuation of spherical aberration in chromatic aberration, and this is not preferable. If conversely, the lower limit of expression (4) is exceeded, spherical aberration will become under-corrected, and this is not preferable.

Now, the second lens unit G2 is a focusing unit and therefore, it must be made light in weight. For this purpose, it is desirable that in the second lens unit, the negative lens component L21 adjacent to the object side be comprised of a single lens.

Generally, in the second lens unit G2, spherical aberration is more readily created greatly to plus when the object side negative lens component L21 having a great effective diameter is comprised of a single lens than when the image side negative lens component L22 is comprised of a single lens. However, by prescribing the first lens unit G1 and the second lens unit G2 in conditional expressions (1)–(4), it becomes possible to create spherical aberration in the minus direction in the first lens unit G1 so that the bending of spherical aberration created in the second lens unit G2 may be offset.

Further, to effect better aberration correction, it is desirable that when the Abbe number of the object side negative lens component L21 in the second lens unit G2 is $\nu a$, the following condition be satisfied:

$$45 < \nu a \quad (5)$$

If the lower limit of expression (5) is exceeded, chromatic difference of magnification, particularly chromatic difference of magnification for g line, will become great in the minus direction and the correction thereof will be difficult, and this is not preferable.

To correct aberrations better, it is desirable that when the refractive index and Abbe number of the positive meniscus lens in the image side negative lens component L22 in the second lens unit G2 are Nb and $\nu b$, respectively, and the refractive index and Abbe number of the biconcave lens in said negative lens component L22 are Nc and $\nu c$, respectively, the following conditions be satisfied:

$$0.1 < Nb - Nc < 0.35 \tag{6}$$

$$25 < \nu c - \nu b \tag{7}$$

Expressions (6) and (7) are conditional expressions for determining the refractive power of the achromatic surface optimum for the correction of spherical aberration for each wavelength.

If the lower limit of expression (6) is exceeded, particularly the refractive power of the achromatic surface for d line will become weak and will not contribute to the correction of spherical aberration for d line, and this will no longer be rational choice of glass. If conversely, the upper limit of expression (6) is exceeded, the refractive power of the achromatic surface will become strong and spherical aberration will become greatly undercorrected, and this is not preferable.

If the lower limit of expression (7) is exceeded, the radius of curvature of the achromatic surface will become sharp to correct on-axis chromatic aberration and chromatic difference of magnification and therefore, spherical aberration, particularly spherical aberration of short wavelength, will become greatly under-corrected, and this is not preferable.

In the present invention, if the refractive power of the first lens unit G1 is too strong, the spherical aberration of the first lens unit G1 itself will become too great in the minus direction and aberrations as the entire photographing optical system will be aggravated. Therefore, to make the amount of focusing movement small and obtain good spherical aberration, it is desirable that the following conditional expression be satisfied:

$$0.55 < \Phi/f_1 < 0.72, \tag{8}$$

where $\Phi$: the effective diameter of the object side lens surface of the positive lens component L11 in the first lens unit G1 which is most adjacent to the object side;

$f_1$: the focal length of the first lens unit G1.

Expression (8) is a conditional expression which prescribes the ratio of the effective diameter $\Phi$ of the object side lens surface of the positive lens component L11 in the first lens unit G1 which is most adjacent to the object side to the focal length $f_1$ of the first lens unit. If the upper limit of expression (8) is exceeded, the focal length $f_1$ of the first lens unit G1 will be too small relative to the effective diameter and therefore, the spherical aberration of the first lens unit G1 itself will become too great in the minus direction with bending of a high order and thus, the correction thereof will become difficult. The spherical aberration of the second order color will also become great, and to correct these, it will become difficult for the first lens unit G1 to be comprised of a small number of lenses as in the present invention. If conversely, the lower limit of expression (8) is exceeded, the focal length of the first lens unit G1 will become long and therefore, the amount of focusing movement will become great to thereby increase the full length of the lens, and this is against the object of the present invention.

Further, in the present invention, the focal length of the first lens unit G1 is very short and therefore, spherical aberration tends to become great in the minus direction. So, it is desirable that the first lens unit G1 be comprised, in succession from the object side, a front group G11 comprised of a positive lens component L11 having its convex surface facing the object side, a biconvex positive. lens component L12 and a biconcave negative lens component L13 and having positive refractive power as a whole, and a rear group G12 of positive refractive power.

The reason for this will hereinafter be described.

An optical system having a long focal length is long in photographing distance as compared with a case where the same magnification is obtained by an optical system having a standard focal length. Therefore, a ray of light from the on-axis object point incident on the first lens of a telephoto lens (hereinafter referred to as the R and ray), even if it is a ray of light emitted from a short distance object point, enters the first entrance surface substantially in prallelism to the optical axis. Therefore, if the positive lens component L11 having its convex surface facing the object side in the first lens unit G1 is considered to be an aggregate of minute prisms, it is necessary to make it approximate to a form of minimum angle of deviation. So, the object side surface of the positive lens component L11 is made into a convex surface and the image side surface thereof is rendered into a gentle curvature, the positive lens component L11 will become approximate to a form of minimum angle of deviation. The sign of the radius of curvature of the image side surface may be either positive or negative depending on the aberration structure in the first lens unit G1.

The R and ray incident on the positive lens component L11 of such a shape becomes a convergent light beam. In order to make this light beam more convergent, the positive lens component L12 also is made into a biconvex positive lens component having its surface of sharper curvature facing the object side so as to assume a minimum angle of deviation. Thereby, the first lens unit G1 having positive refractive power is substantially determined by the positive lens component L11 and the positive lens component L12.

However, with these two positive lens components alone, spherical aberration and chromatic aberration become too great in the minus direction and therefore, a negative lens component L13 is disposed just rearwardly of the positive lens component L12 to thereby effect appropriate aberration correction. Further, in order to distribute the strong refractive power of the first lens unit G1, the rear group G12 having a positive lens component L14 is disposed rearwardly of the front group G11. The location of the rear group G12 relative to the front group G11 is spaced apart to a certain degree from the front group G11 to make the lens diameter of the rear group G12 as small as possible, but is determined by the brightness borne by the first lens unit G1. Thus, aberrations created in the first lens unit G1, particularly spherical aberration, can be borne by the two positive lens groups, i.e., the front group G11 and the rear group G12, and each lens has strong refractive power, and the bending of spherical aberration created when the correction of the spherical aberration is effected can be suppressed.

Referring to the rear group G12 in the first lens unit G1, in order to obtain better aberrations, and particularly from the viewpoint of chromatic correction, it is preferable that the positive lens component L14 in the rear group G12 be a cemented lens comprised, in succession from the object side, of a negative meniscus lens having its convex surface facing the object side and a positive meniscus lens having its convex surface facing the object side. Thereby, the spherical aberration in the first lens unit G1 can be corrected and at the same time, on-axis chromatic aberration and chromatic difference of magnification therein can also be corrected.

Figure 2:
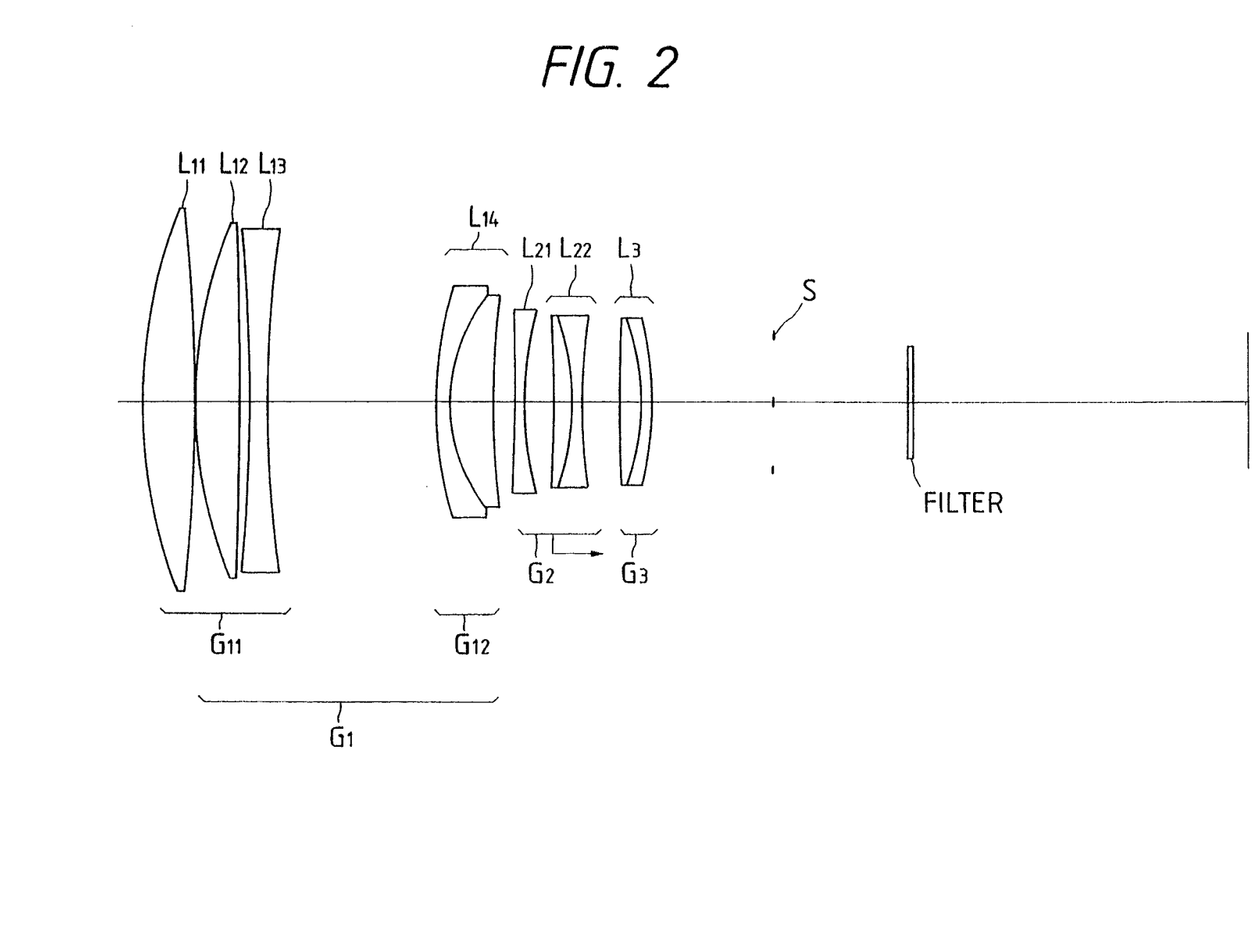
FIG. 2 shows the lens construction of Embodiment 2 of the present invention.
Figure 3:
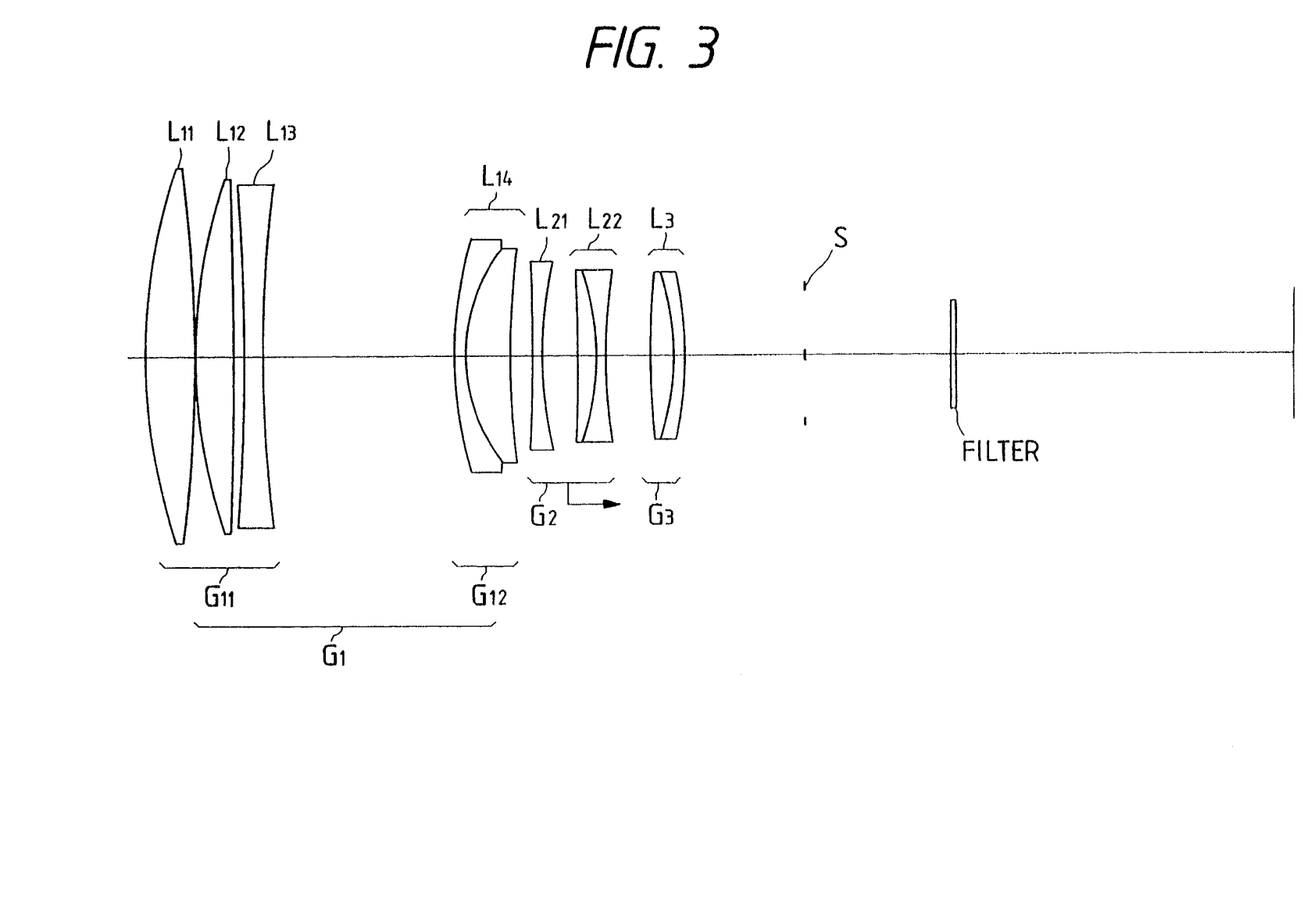
FIG. 3 shows the lens construction of Embodiment 3 of the present invention.

FIGS. 1, 2 and 3 show the lens constructions of Embodiments 1 to 3, respectively, of the present invention. Each embodiment is comprised of a first lens unit G1 of positive refractive power, a second lens unit G2 of negative refractive power and a third lens unit G3 of positive refractive power, and the first lens unit G1 and the second lens unit G2 together form a substantially afocal system, and during focusing from infinity to a short distance, the second lens unit G2 is moved toward the image side.

In each embodiment, in succession from the object side, the first lens unit G1 is comprised of a front group G11 comprising a positive lens L12 having its surface of sharper curvature facing the object side and a biconcave negative lens L13, and a rear group G12 comprising a positive lens component L14, the second lens unit G2 is comprised of a biconcave negative lens L21 and a negative lens component L22 comprising a positive lens having its surface of sharper curvature facing the image side and a biconcave negative lens cemented thereto, and the third lens unit G3 is comprised of a positive lens component L3 comprising a biconvex lens and a positive meniscus lens cemented thereto and having its concave surface facing the object side, an aperture stop S and a filter.

The numerical values of each embodiment of the present invention will be shown below. In the tables below, the numbers at the left end represent the order from the object side, $r$ represents the radius of curvature of each lens surface, d represents the spacing between adjacent lens surfaces, refractive index n and Abbe number $\nu$ are values for d line ($\lambda=587.6$ nm), F represents the focal length of the whole system, FN represents F number, $\beta$ represents the photographing magnification, and D0 represents the distance from an object to the first lens surface.

TABLE 1

Numerical Data of Embodiment 1

| | r | d | $\nu$ | n |
|---|---|---|---|---|
| | F = 392.0, FN = 2.88 | | | |
| 1 | 198.753 | 19.70 | 82.6 | 1.49782 |
| 2 | −543.380 | .10 | | |
| 3 | 165.419 | 16.70 | 82.6 | 1.49782 |
| 4 | −2363.700 | 3.30 | | |
| 5 | −810.410 | 6.50 | 35.2 | 1.74950 |
| 6 | 369.129 | 71.30 | | |
| 7 | 155.231 | 4.50 | 55.6 | 1.69680 |
| 8 | 61.012 | 17.50 | 67.9 | 1.59319 |
| 9 | 286.104 | (d9) | | |
| 10 | −308.425 | 4.50 | 64.1 | 1.51680 |
| 11 | 121.973 | 19.80 | | |
| 12 | −283.082 | 7.00 | 23.8 | 1.84666 |
| 13 | −84.300 | 4.00 | 49.1 | 1.53172 |
| 14 | 97.213 | (d14) | | |
| 15 | 138.856 | 10.20 | 82.6 | 1.49782 |
| 16 | −80.085 | 5.00 | 31.1 | 1.68893 |
| 17 | −130.842 | 46.34 | | |
| 18 | ∞ | 2.00 | 64.1 | 1.51680 |
| 19 | ∞ | (Bf) | | |
| | F = 392.0066 $\beta$ = −.1446 | | | |
| D0 | ∞ | 2925.7669 | | |
| d9 | 8.2485 | 26.0802 | | |
| d14 | 23.0326 | 5.2009 | | |
| Bf | 104.5069 | 104.5069 | | |

When the distance from the object to the image plane is R, the amount of movement $\Delta x$ of the focusing unit from infinity to the close distance R=3300 is 17.83.

Condition-corresponding numerical values are shown below.

(1) $f_1/F=0.561$
(2) $f_{22}/f_{21}=1.254$
(3) $(Rb+Ra)/(Rb-Ra)=-0.433$
(4) $(Rd+Rc)/(Rd-Rc)=-2.043$
(5) $\nu a=64.1$
(6) $Nb-Nc=0.31$
(7) $\nu c-\nu b=25.3$
(8) $\Phi/f_1=0.619$

TABLE 2

Numerical Data of Embodiment 2

| | r | d | $\nu$ | n |
|---|---|---|---|---|
| | F = 490.0, FN = 4.08 | | | |
| 1 | 157.931 | 18.40 | 82.6 | 1.49782 |
| 2 | −483.797 | .50 | | |
| 3 | 153.844 | 14.50 | 82.6 | 1.49782 |
| 4 | −2187.020 | 4.10 | | |
| 5 | −583.446 | 5.80 | 35.2 | 1.74950 |
| 6 | 315.144 | 57.90 | | |
| 7 | 114.678 | 4.70 | 55.6 | 1.69680 |
| 8 | 51.327 | 15.00 | 67.9 | 1.59319 |
| 9 | 231.972 | (d9) | | |
| 10 | −1017.171 | 3.70 | 49.4 | 1.77279 |
| 11 | 112.771 | 10.00 | | |
| 12 | −323.225 | 6.50 | 23.8 | 1.84666 |
| 13 | −75.897 | 3.30 | 53.8 | 1.69350 |
| 14 | 159.335 | (d14) | | |
| 15 | 612.718 | 7.60 | 82.6 | 1.49782 |
| 16 | −75.056 | 4.00 | 31.1 | 1.68893 |
| 17 | −104.451 | 88.70 | | |
| 18 | ∞ | 2.00 | 64.1 | 1.51680 |
| 19 | ∞ | (Bf) | | |
| | F = 489.9998 $\beta$ = −.1102 | | | |
| D0 | ∞ | 4617.3006 | | |
| d9 | 7.7131 | 15.1604 | | |
| d14 | 13.0823 | 5.6350 | | |
| Bf | 115.2040 | 115.2040 | | |

When the distance from the object to the image plane is R, the amount of movement $\Delta x$ of the focusing unit from infinity to the close distance R=5000 is 7.44

Condition-corresponding numerical values are shown below.

(1) $f_1/F=0.371$
(2) $f_{22}/f_{21}=1.531$
(3) $(Rb+Ra)/(Rb-Ra)=-0.800$
(4) $(Rd+Rc)/(Rd-Rc)=-1.728$
(5) $\nu a=49.4$
(6) $Nb-Nc=0.15$
(7) $\nu c-\nu b=30.0$
(8) $\Phi/f_1=0.660$

TABLE 3

Numerical Data of Embodiment 3

| | r | d | $\nu$ | n |
|---|---|---|---|---|
| | F = 490.0, FN = 4.08 | | | |
| 1 | 179.425 | 17.10 | 82.6 | 1.49782 |
| 2 | −529.091 | .30 | | |
| 3 | 163.531 | 14.10 | 82.6 | 1.49782 |
| 4 | −2301.908 | 3.50 | | |
| 5 | −721.003 | 6.20 | 35.2 | 1.74950 |
| 6 | 333.980 | 65.80 | | |
| 7 | 129.628 | 4.70 | 55.6 | 1.69680 |
| 8 | 58.509 | 15.00 | 67.9 | 1.59319 |
| 9 | 230.175 | (d9) | | |
| 10 | −2322.024 | 3.70 | 64.1 | 1.51680 |
| 11 | 118.408 | 12.90 | | |
| 12 | −304.262 | 5.50 | 23.8 | 1.84666 |
| 13 | −90.946 | 3.30 | 53.8 | 1.69350 |
| 14 | 136.918 | (d14) | | |
| 15 | 437.377 | 7.50 | 82.6 | 1.49782 |
| 16 | −84.574 | 4.00 | 31.1 | 1.68893 |
| 17 | −117.150 | 92.20 | | |
| 18 | ∞ | 2.00 | 64.1 | 1.51680 |

TABLE 3-continued

| | Numerical Data of Embodiment 3 | | | |
|---|---|---|---|---|
| | r | d | v | n |
| 19 | ∞ | (Bf) | | |
| | F = 490.0001 β = −.1113 | | | |
| D0 | ∞ | 4602.5662 | | |
| d9 | 7.5309 | 17.2611 | | |
| d14 | 15.9293 | 6.1991 | | |
| Bf | 116.1735 | 116.1735 | | |

When the distance from the object to the image plane is R, the amount of movement Δx of the focusing unit from infinity to the close distance R=5000 is 9.73.

Condition-corresponding numerical values are shown below.

(1) $f_1/F = 0.422$
(2) $f_{22}/f_{21} = 0.740$
(3) $(Rb+Ra)/(Rb-Ra) = -0.903$
(4) $(Rd+Rc)/(Rd-Rc) = -1.912$
(5) $va = 64.1$
(6) $Nb-Nc = 0.15$
(7) $vc-vb = 30.0$
(8) $\Phi/f_1 = 0.580$

It is seen from the above-described embodiments that the amount of movement of the second lens unit which is the focusing unit in the focusing from infinity to the close distance is small.

According to the present invention, at least one lens unit is moved in a direction substantially perpendicular to the optical axis, whereby an antivibration effect can be obtained.

According to the present invention, there can be achieved an internal focus telephoto lens in which the amount of movement of the focusing unit during focusing is suppressed to a small amount and yet an excellent imaging performance can be maintained over infinity to the close distance.

What is claimed is:

1. An internal focus telephoto lens system comprising, in succession from an object side to an image side: a first lens unit G1 of positive refractive power, a second lens unit G2 of negative refractive power and a third lens unit G3 of positive refractive power, said first lens unit G1 and said second lens unit G2 together forming a substantially a focal system, focusing being effected by said second lens unit G2, characterized in that said first lens unit G1 comprises, in succession from the object side, a front group G11 of positive refractive power and a rear group G12 having weak positive refractive power relative to said front group, said front group G11 being comprised, in succession from the object side, of a positive lens component L11, a positive lens component L12 and a negative lens component L13, said second lens unit G2 comprises, in succession from the object side, a negative lens component L21 and a negative lens component L22, said third lens unit G3 comprises a positive lens component L3, and said internal focus telephoto lens satisfies the following conditions:

(1) $0.35 < f_1/F < 0.60$
(2) $0.7 < f_{22}/f_{21} < 1.6$
(3) $-1.0 < (Rb+Ra)/(Rb-Ra) < -0.4$
(4) $-2.1 < (Rd+Rc)/(Rd-Rc) < -1.7$ where
$f_1$: the focal length of the first lens unit G1;
F: the focal length of the system;
$f_{21}$: the focal length of the negative lens component L21 in the second lens unit G2;
$f_{22}$: the focal length of the negative lens component L22 in the second lens unit G2;
Ra: the radius of curvature of the object side of the negative lens component L21 in the second lens unit G2;
Rb: the radius of curvature of the image side of the negative lens component L21 in the second lens unit G2;
Rc: the radius of curvature of the image side of the positive lens component L12 in the first lens unit G1;
Rd: the radius of curvature of the object side of the negative lens component L13 in the first lens unit G1.

2. An internal focus telephoto lens according to claim 1, characterized in that the negative lens component L21 in said second lens unit G2 comprises a negative lens.

3. An internal focus telephoto lens according to claim 2, characterized in that when an Abbe number of the object side negative lens component L21 in said second lens unit G2 is $va$, the following condition is satisfied:

$$45 < va. \tag{5}$$

4. An internal focus telephoto lens according to claim 1, characterized in that the image side negative lens component L22 in said second lens unit G2 is of a construction comprising, in succession from the object side, a positive meniscus lens having its concave surface facing the object side and a biconcave lens cemented thereto, and the following conditions are satisfied:

$$0.1 < Nb - Nc < 0.35 \tag{6}$$

$$25 < vc - vb, \tag{7}$$

where
Nb: the refractive index of the positive meniscus lens in the image side negative lens component L22 in the second lens unit G2;
$vb$: the Abbe number of the positive meniscus lens in the image side negative lens component L22 in the second lens unit G2;
Nc: the refractive index of the biconcave lens in the image side negative lens component L22 in the second lens unit G2;
$vc$: the Abbe number of the biconcave lens in the image side lens component L22 in the second lens unit G2.

5. An internal focus telephoto lens according to claim 1, characterized in that said first lens unit G1 satisfies the following condition:

$$0.55 < \phi/f_1 < 0.72,$$

where
$\phi$: the effective diameter of the object side lens surface of the positive lens component L11 in the first lens unit G1 which is most adjacent to the object side.

6. An internal focus telephoto lens according to claim 2, characterized in that said first lens unit G1 satisfies the following condition:

$$0.55 < \phi/f_1 < 0.72, \tag{8}$$

where
$\Phi$: the effective diameter of the object side lens surface of the positive lens component L11 in the first lens unit G1 which is most adjacent to the object side.

7. An internal focus telephoto lens according to claim 3, characterized in that said first lens unit G1 satisfies the following condition:

$$0.55 < 101/f_1 < 0.72, \qquad (8)$$

where
Φ: the effective diameter of the object side
lens surface of the positive lens component L11 in the first lens unit G1 which is most adjacent to the object side.

8. An internal focus telephoto lens according to claim 4, characterized in that said first lens unit G1 satisfies the following condition:

$$0.55 < \phi/f_1 < 0.72, \qquad (8)$$

where
Φ: the effective diameter of the object side lens surface of the positive lens component L11 in the first lens unit G1 which is most adjacent to the object side.

9. An internal focus telephoto lens according to claim 1, characterized in that said rear group G12 in said first lens unit G1 is a cemented lens comprising, in succession from the object side, a negative meniscus lens having its convex surface facing the object side, and a positive meniscus lens having its convex surface facing the object side.

10. An internal focus telephoto lens according to claim 2, characterized in that said rear group G12 in said first lens unit G1 is a cemented lens comprising, in succession from the object side, a negative meniscus lens having its convex surface facing the object side, and a positive meniscus lens having its convex surface facing the object side.

11. An internal focus telephoto lens according to claim 3, characterized in that said rear group G12 in said first lens unit G1 is a cemented lens comprising, in succession from the object side, a negative meniscus lens having its convex surface facing the object side, and a positive meniscus lens having its convex surface facing the object side.

12. An internal focus telephoto lens according to claim 4, characterized in that said rear group G12 in said first lens unit G1 is a cemented lens comprising, in succession from the object side, a negative meniscus lens having its convex surface facing the object side, and a positive meniscus lens having its convex surface facing the object side.

13. An internal focus telephoto lens according to claim 5, characterized in that said rear group G12 in said first lens unit G1 is a cemented lens comprising, in succession from the object side, a negative meniscus lens having its convex surface facing the object side, and a positive meniscus lens having its convex surface facing the object side.

14. An internal focus telephoto lens according to claim 6, characterized in that said rear group G12 in said first lens unit G1 is a cemented lens comprising, in succession from the object side, a negative meniscus lens having its convex surface facing the object side, and a positive meniscus lens having its convex surface facing the object side.

15. An internal focus telephoto lens according to claim 7, characterized in that said rear group G12 in said first lens unit G1 is a cemented lens comprising, in succession from the object side, a negative meniscus lens having its convex surface facing the object side, and a positive meniscus lens having its convex surface facing the object side.

16. An internal focus telephoto lens according to claim 8, characterized in that said rear group G12 in said first lens unit G1 is a cemented lens comprising, in succession from the object side, a negative meniscus lens having its convex surface facing the object side, and a positive meniscus lens having its convex surface facing the object side.

17. An internal focus telephoto lens according to claim 1, designed with the following numerical values:

|    | r | d | v | n |
|----|---|---|---|---|
| | F = 392.0, FN = 2.88 | | | |
| 1  | 198.753 | 19.70 | 82.6 | 1.49782 |
| 2  | −543.380 | .10 | | |
| 3  | 165.419 | 16.70 | 82.6 | 1.49782 |
| 4  | −2363.700 | 3.00 | | |
| 5  | −810.410 | 6.50 | 35.2 | 1.74950 |
| 6  | 369.129 | 71.30 | | |
| 7  | 155.231 | 4.50 | 55.6 | 1.69680 |
| 8  | 61.012 | 17.50 | 67.9 | 1.59319 |
| 9  | 286.104 | (d9) | | |
| 10 | −308.425 | 4.50 | 64.1 | 1.51680 |
| 11 | 121.973 | 19.80 | | |
| 12 | −283.082 | 7.00 | 23.8 | 1.84666 |
| 13 | −84.300 | 4.00 | 49.1 | 1.53172 |
| 14 | 97.213 | (d14) | | |
| 15 | 138.856 | 10.20 | 82.6 | 1.49782 |
| 16 | −80.085 | 5.00 | 31.1 | 1.68893 |
| 17 | −130.842 | 46.34 | | |
| 18 | ∞ | 2.00 | 64.1 | 1.51680 |
| 19 | ∞ | (Bf) | | |
| | F = 392.0066  β = −.1446 | | | |
| D0 | ∞ | 2925.7669 | | |
| d9 | 8.2485 | 26.0802 | | |
| d14 | 23.0326 | 5.2009 | | |
| Bf | 104.5069 | 104.5069 | | | when the distance from the object to the image plane is R, the amount of movement Δx of the focusing unit from infinity to the close distance R=3300 is 17.83 condition-corresponding numerical values are shown below (1) $f_1/F = 0.561$
(2) $f_{22}/f_{21} = 1.254$
(3) $(Rb+Ra)/(Rb-Ra) = -0.433$
(4) $(Rd+Rc)/(Rd-Rc) = -2.043$
(5) $\nu a = 64.1$
(6) $Nb - Nc = 0.31$
(7) $\nu c - \nu b = 25.3$
(8) $\Phi/f_1 = 0.619$ in the foregoing table, the numbers at the left end represents the order from the object side, r represents the radius of curvature of each lens surface, d represents the spacing between adjacent lens surfaces, refractive index n and Abbe number ν are values for d line (λ=587.6 nm), FN represents F number, β represents the photographing magnification, and D0 represents the distance from the object to the first lens surface in the foregoing,
νa: the Abbe number of the object side negative lens component L21 in the second lens unit G2;
Nb: the refractive index of the positive meniscus lens in the image side negative lens component L22 in the second lens unit G2;

νb: the Abbe number of the positive meniscus lens in the image side negative lens component L22 in the second lens unit G2;

Nc: the refractive index of the biconcave lens in the image side negative lens component L22 in the second lens unit G2;

νc: the Abbe number of the biconcave lens in the image side negative lens component L22 in the second lens unit G2;

Φ: the effective diameter of the object side lens surface of the positive lens component L11 in the first lens unit G1 which is most adjacent to the object side.

18. An internal focus telephoto lens according to claim 1, designed with the following numerical values:

|   | r | d | ν | n |
|---|---|---|---|---|
|   | F = 490.0, FN = 4.08 | | | |
| 1 | 157.931 | 18.40 | 82.6 | 1.49782 |
| 2 | −483.797 | .50 | | |
| 3 | 153.844 | 14.50 | 82.6 | 1.49782 |
| 4 | −2187.020 | 4.10 | | |
| 5 | −583.446 | 5.80 | 35.2 | 1.74950 |
| 6 | 315.144 | 57.90 | | |
| 7 | 114.678 | 4.70 | 55.6 | 1.69680 |
| 8 | 51.327 | 15.00 | 67.9 | 1.59319 |
| 9 | 231.972 | (d9) | | |
| 10 | −1017.171 | 3.70 | 49.4 | 1.77279 |
| 11 | 112.771 | 10.00 | | |
| 12 | −323.225 | 6.50 | 23.8 | 1.84666 |
| 13 | −75.897 | 3.30 | 53.8 | 1.69350 |
| 14 | 159.335 | (d14) | | |
| 15 | 612.718 | 7.60 | 82.6 | 1.49782 |
| 16 | −75.056 | 4.00 | 31.1 | 1.68893 |
| 17 | −104.451 | 88.70 | | |
| 18 | ∞ | 2.00 | 64.1 | 1.51680 |
| 19 | ∞ | (Bf) | | |
|   | F = 489.9998 β = −.1102 | | | |
| D0 | ∞ | 4617.3006 | | |
| d9 | 7.7131 | 15.1604 | | |
| d14 | 13.0823 | 5.6350 | | |
| Bf | 115.2040 | 115.2040 | | | when the distance from the object to the image plane is R, the amount of movement Δx of the focusing unit from infinity to the close distance R=5000 is 7.44 condition-corresponding numerical values are shown below (1) $f_1/F = 0.371$
(2) $f_{22}/f_{21} = 1.531$
(3) $(Rb+Ra)/(Rb-Ra) = -0.800$
(4) $(Rd+Rc)/(Rd-Rc) = -1.728$
(5) $νa = 49.4$
(6) $Nb-Nc = 0.15$
(7) $νc-νb = 30.0$
(8) $Φ/f_1 = 0.660$ in the foregoing table, the numbers at the left end represent the order from the object side, r represents the radius of curvature of each lens surface, d represents the spacing between adjacent lens surfaces, refractive index n and Abbe number ν are values for d line (λ=587.6 nm), FN represents F number, β represents the photographing magnification, and D0 represents the distance from the object to the first lens surface, in the foregoing, νa: the Abbe number of the object side negative lens component L21 in the second lens unit G2;

Nb: the refractive index of the positive meniscus lens in the image side negative lens component L22 in the second lens unit G2;

νb: the Abbe number of the positive meniscus lens in the image side negative lens component L22 in the second lens unit G2;

Nc: the refractive index of the biconcave lens in the image side negative lens component L22 in the second lens unit G2; νc: the Abbe number of the biconcave lens in the image side negative lens component L22 in the second lens unit G2;

Φ: the effective diameter of the object side lens surface of the positive lens component L11 in the first lens unit G1 which is most adjacent to the object side.

19. An internal focus telephoto lens according to claim 1, designed with the following numerical values:

|   | r | d | ν | n |
|---|---|---|---|---|
|   | F = 490.0, FN = 4.08 | | | |
| 1 | 179.425 | 17.10 | 82.6 | 1.49782 |
| 2 | −529.091 | .30 | | |
| 3 | 163.531 | 14.10 | 82.6 | 1.49782 |
| 4 | −2301.908 | 3.50 | | |
| 5 | −721.003 | 6.20 | 35.2 | 1.74950 |
| 6 | 333.980 | 65.80 | | |
| 7 | 129.628 | 4.70 | 55.6 | 1.69680 |
| 8 | 58.509 | 15.00 | 67.9 | 1.59319 |
| 9 | 230.175 | (d9) | | |
| 10 | −2322.024 | 3.70 | 64.1 | 1.51680 |
| 11 | 118.408 | 12.90 | | |
| 12 | −304.262 | 5.50 | 23.8 | 1.84666 |
| 13 | −90.946 | 3.30 | 53.8 | 1.69350 |
| 14 | 136.918 | (d14) | | |
| 15 | 437.377 | 7.50 | 82.6 | 1.49782 |
| 16 | −84.574 | 4.00 | 31.1 | 1.68893 |
| 17 | −117.150 | 92.20 | | |
| 18 | ∞ | 2.00 | 64.1 | 1.51680 |
| 19 | ∞ | (Bf) | | |
|   | F = 490.0001 β = −.1113 | | | |
| D0 | ∞ | 4602.5662 | | |
| d9 | 7.5309 | 17.2611 | | |
| d14 | 15.9293 | 6.1991 | | |
| Bf | 116.1735 | 116.1735 | | | when the distance from the object to the image plane is R, the amount of movement Δx of the focusing unit from infinity to the close distance R=5000 is 9.73 condition-corresponding numerical values are shown below (1) $f_1/F = 0.422$
(2) $f_{22}/f_{21} = 0.740$
(3) $(Rb+Ra)/(Rb-Ra) = -0.903$
(4) $(Rd+Rc)/(Rd-Rc) = -1.912$
(5) $νa = 64.1$
(6) $Nb-Nc = 0.15$
(7) $νc-νb = 30.0$
(8) $Φ/f_1 = 0.580$ in the foregoing table, the numbers at the left end represent the order from the object side, r represents the radius of curvature of each lens surface, d represents the spacing between adjacent lens surfaces, refractive index n and Abbe number ν are values for d line (λ=587.6 nm), FN represents F number, β represents the photographing magnification, and D0 represents the distance from the object to the first lens surface in the foregoing, νa: the Abbe number of the object side negative lens component L21 in the second lens unit G2;

Nb: the refractive index of the positive meniscus lens in the image side negative lens component L22 in the second lens unit G2;

νb: the Abbe number of the positive meniscus lens in the image side negative lens component L22 in the second lens unit G2;

Nc: the refractive index of the biconcave lens in the image side negative lens component L22 in the second lens unit G2;

νc: the Abbe number of the biconcave lens in the image side negative lens component L22 in the second lens unit G2;

Φ: the effective diameter of the object side lens surface of the positive lens component L11 in the first lens unit G1 which is most adjacent to the object side.

20. An internal focus telephoto lens according to claim 1, wherein at least one of said lens units can be moved in a direction substantially perpendicular to an optical axis to thereby obtain an antivibration effect.

* * * * *